United States Patent
Tsai et al.

(10) Patent No.: US 12,508,290 B2
(45) Date of Patent: Dec. 30, 2025

(54) **USE OF *LACTOBACILLUS PARACASEI* GMNL-346 FOR ANTI-ORAL CANCER TREATMENT AND THEREOF**

(71) Applicant: GenMont Biotech Incorporation, Tainan (TW)

(72) Inventors: Wan-Hua Tsai, Kaohsiung (TW); I-Ling Hsu, Tainan (TW); Wen-Wei Chang, Taichung (TW); Peng-Ju Chien, Taichung (TW); Yu-Chieh Hung, Kaohsiung (TW)

(73) Assignee: GENMONT BIOTECH INCORPORATION, Tianan (TW)

( * ) Notice: Subject to any disclaimer, the term of this patent is extended or adjusted under 35 U.S.C. 154(b) by 190 days.

(21) Appl. No.: 18/183,544

(22) Filed: Mar. 14, 2023

(65) Prior Publication Data
US 2023/0233627 A1    Jul. 27, 2023

Related U.S. Application Data

(63) Continuation-in-part of application No. 16/865,834, filed on May 4, 2020, now abandoned.

(30) Foreign Application Priority Data

Jan. 14, 2020   (TW) ................. 109101168

(51) Int. Cl.
| | | |
|---|---|---|
| *A61K 35/747* | (2015.01) | |
| *A61P 35/00* | (2006.01) | |
| *C12N 1/20* | (2006.01) | |
| *C12R 1/245* | (2006.01) | |

(52) U.S. Cl.
CPC ............ *A61K 35/747* (2013.01); *A61P 35/00* (2018.01); *C12N 1/205* (2021.05); *C12R 2001/245* (2021.05)

(58) Field of Classification Search
CPC ....... A61K 35/747; A61P 35/00; C12N 1/205; C12R 2001/245
See application file for complete search history.

(56) References Cited

PUBLICATIONS

Siegel et al., "Cancer Statistics, 2018," CA Cancer J Clin, vol. 68, No. 1, 2018, pp. 7-30, 24 pages.
Olsen et al., "Possible role of *Porphyromonas gingivalis* in orodigestive cancers," Journal of Oral Microbiology, vol. 11, 2019, 12 pages.
Nazir et al., "Probiotics and Their Potential Preventive and Therapeutic Role for Cancer, High Serum Cholesterol, and Allergic and HIV Diseases," BioMed Research International, 2018, 17 pages.
Toi et al., "Probiotic Beverage with Soy Isoflavone Consumption for Breast Cancer Prevention: A Case-control Study," Current Nutrition & Food Science, 2013, vol. 9, pp. 194-200, 7 pages.
Ohashi et al., "Habitual Intake of Lactic Acid Bacteria and Risk Reduction of Bladder Cancer," Urologia Internationalis, 2002, vol. 68, pp. 273-280, 8 pages.
Verhoeven et al., "Probiotics enhance the clearance of human papillomavirus-related cervical lesions: a prospective controlled pilot study," European Journal of Cancer Prevention, 2013, vol. 22, No. 1, pp. 46-51, 6 pages.

*Primary Examiner* — Robert A Zeman
(74) *Attorney, Agent, or Firm* — MUNCY, GEISSLER, OLDS & LOWE, P.C.

(57) ABSTRACT

A method for preventing or treating oral cancer includes administering a composition comprising *Lactobacillus paracasei* or a supernatant of the heat-killed *Lactobacillus paracasei*. A composition that contains an active ingredient with anti-oral cancer effect. The active ingredient is *Lactobacillus paracasei* GMNL-346 or the supernatant of the heat-killed GMNL-346. The deposition number of the *Lactobacillus paracasei* GMNL-346 is BCRC 910953 or CCTCC M 2019983.

4 Claims, 10 Drawing Sheets

(A)

(B)

(C)

USE OF *LACTOBACILLUS PARACASEI* GMNL-346 FOR ANTI-ORAL CANCER TREATMENT AND THEREOF

CROSS-REFERENCE TO RELATED APPLICATIONS

The present application is a continuation-in-part of co-pending U.S. application Ser. No. 16/865,834 filed on May 4, 2020, for which priority is claimed under 35 U.S.C. § 120; and this application claims priority of Application No. 109101168, filed in TW on Jan. 14, 2020 under 35 U.S.C. § 119(e), the entire contents of all of which are hereby incorporated by reference.

BACKGROUND OF THE INVENTION

1. Field of the Invention

The present invention relates to an isolated strain of *Lactobacillus*, in particular, the field of *Lactobacillus paracasei* for use against oral cancer.

2. Description of the Prior Art

According to the latest statistics from the United States in 2018, oral cancer ranks eighth among the top ten cancers in men, with an incidence of 2.58 times that of women. Though the five-year survival rate of patients with early-stage oral cancer is as high as 84%, the five-year survival rate is only 39% as the tumor becomes more malignant [1]. In Taiwan, oral cancer is the fourth most common cause of cancer and death in men [2], and it is closely related to risk factors such as chewing betel nut, smoking, and drinking. Recent studies have indicated that an imbalance in the oral flora and immune response can affect oral health. For example, *Porphyromonas gingivalis* is not only a major pathogen of periodontal disease, but chronic infection of the bacteria is more likely to cause the development of oral cancer and promote the progression of oral cancer [3]. Ninety percent of oral cancers are squamous cell carcinomas, including tongue cancer, oral cancer, oropharyngeal cancer, and hypopharyngeal cancer, and the buccal mucosa of the tongue and oral cavity is the most common affected area.

Traditional oral cancer treatment is surgical resection and radiation therapy or a combination of chemotherapy and radiation therapy. Immunotherapy that has attracted much attention in recent years has also shown great potential in animal studies and clinical trials related to oral cancer treatment. For example, in mice with oral cancer in situ, inhibition of the programmed cell death protein 1 (PD-1) or programmed death-ligand 1 (PD-L1) can be used to regulate T cell function, improve the treatment effect of radiation therapy and survival rate of the mice.

Past research has found that probiotics have many effects, including balancing the intestinal microbial flora, improving the gastrointestinal barrier, and inhibiting potential pathogenic bacteria or cancer in the intestine. Therefore, probiotics are considered as a new strategy for cancer prevention and treatment. For example, *Lactobacillus rhamnosus* GG (LGG) and *Bifidobacterium adolescentis* SPM0212 can inhibit the growth of gastric and colorectal cancer cells, *Lactobacillus kefiri* can induce apoptosis of the myeloid leukemia cells, and *Enterococcus lactis* IW5 can reduce the survival rate of many cancer cells [5]. Also, long-term consumption of *Lactobacillus casei* Shirota (BLS) can reduce the incidence of breast cancer, bladder cancer, and human mastoid virus-related cervical cancer [6-8]. Nonetheless, research on the use of probiotics for treating oral cancer is limited. There is still a lack of a strain in the technical field of the invention that can effectively inhibit oral cancer.

REFERENCE

[1] CA Cancer J Clin. 2018 January; 68(1):7-30.
[2] 2016 Cancer Registry Annual Report, Ministry of Health and Welfare, Taiwan
[3] J Oral Microbiol. 2019; 11(1): 1563410.
[4] Oncoimmunology. 2017 Aug. 3; 6(10):e1356153.
[5] Biomed Res Int. 2018; 2018: 3428437.
[6] Curr Nutr Food Sci. 2013 August; 9(3):194-200.
[7] Urologia Internationalis. 2002; 68(4):273-280.
[8] European Journal of Cancer Prevention. 2013; 22(1):46-51.

SUMMARY OF THE INVENTION

Present invention discloses the *Lactobacillus paracasei* GMNL-346 and said strain has been proved to have anti-oral cancer effect.

Present invention provides a composition containing an active ingredient that has an anti-oral cancer effect, wherein the active ingredient is *Lactobacillus paracasei* GMNL-346 or a supernatant of the heat-killed GMNL-346; wherein the deposition number of the *Lactobacillus paracasei* GMNL-346 is BCRC 910953 or CCTCC M 2019983.

According to the invention, the active ingredient is a dead bacterium of *Lactobacillus paracasei* GMNL-346.

According to the invention, the active ingredient is a part of the supernatant of the heat-killed GMNL-346 containing molecules with a molecular weight less than 3 kDa.

According to the invention, the composition is a pharmaceutical composition, nutritional supplement or health food.

According to the invention, said composition may further contain a pharmaceutically acceptable carrier.

According to the invention, the composition is a solution, suspension, emulsion, powder, tablet, pill, syrup, lozenge, oral dispersible film, chewing gum, thick paste or capsule.

According to the invention, said composition may further comprise edible materials, said edible materials include water, fluid dairy product, milk, concentrated milk, yogurt, sour milk, frozen yogurt, *lactobacillus* fermented beverage, milk powder, ice cream, cheese, solid or semi-solid cheese, soy milk, fermented soy milk, fruit and vegetable juices, fruit juices, sports drinks, desserts, jellies, confectionery, baby foods, health foods, animal feeds, Chinese herbal medicines or dietary supplements.

In one aspect, the present invention provides a use of *Lactobacillus paracasei* for preparation of a pharmaceutical composition to prevent or treat oral cancer, which includes using *Lactobacillus paracasei* or a supernatant of the heat-killed *Lactobacillus paracasei* as an active ingredient for prevention or treatment of oral cancer.

According to the invention, the *Lactobacillus paracasei* is *Lactobacillus paracasei* GMNL-346 or a supernatant of the heat-killed GMNL-346 and the deposition number of the GMNL-346 is BCRC 910953 or CCTCC M 2019983.

According to the invention, prevention or treatment of oral cancer refers to inhibition of cell cycle progression of the oral cancer cells.

According to the invention, inhibition of the cell cycle progression of the oral cancer cells refers to inducing G0/G1-phase cell cycle arrest.

According to the invention, prevention or treatment of oral cancer refers to inhibition of the self-renewal ability of the cancer stem cells of the oral cancer cells.

The present invention provides a *Lactobacillus paracasei* GMNL-346 strain which has the effect of inhibiting the growth of oral cancer cells, in particular, the effect of inhibition of the cell cycle progression of oral cancer cells or inhibition of the self-renewal ability of the cancer stem cells in the oral cancer cells. In addition, the present invention also provides a composition containing *Lactobacillus paracasei* GMNL-346 or a supernatant of the heat-killed GMNL-346, which can be used as an active ingredient for treating oral cancer. The composition indicated in the invention uses probiotics as active ingredients and thus has a lower risk of side effects.

These features and advantages of the present invention will be fully understood and appreciated from the following detailed description of the accompanying Drawings.

DETAILED DESCRIPTION OF THE PREFERRED EMBODIMENT

Figure 1:
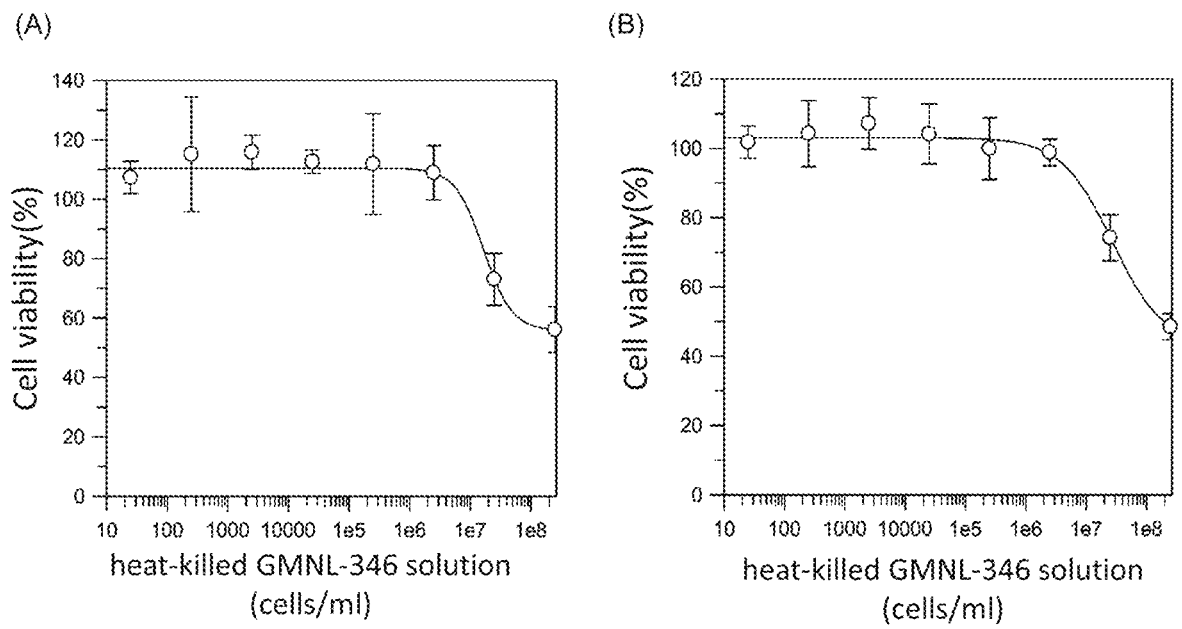
FIG. 1 shows the effects of two batches of cultured *Lactobacillus paracasei* GMNL-346 on the growth of oral cancer cells. (A) shows oral cancer cells treated with the first batch of cultured *Lactobacillus paracasei* GMNL-346 and (B) shows the oral cancer cells treated with the second batch of cultured *Lactobacillus paracasei* GMNL-346.

All technical and scientific terms used in the invention, unless otherwise defined, are the common general knowledge to a person having ordinary skill in the art.

The singular terms "a", "an" and "the" as used in this specification and the scope of the patent application refer to more than one subject unless otherwise stated.

"Or", "and", and "and" used in this specification refer to "or/and" unless stated otherwise. In addition, the terms "including" and "consisting" are not open-ended connectives with restrictions. The preceding paragraph is a systematic reference only and should not be construed as a limitation on the subject of the invention.

The term "oral cancer" in this specification refers to a general term for malignant tumors in the oral cavity, and includes, but is not limited to, squamous cell carcinoma, verrucous carcinoma, adenoid cystic carcinoma or mucoepidermoid carcinoma.

The terms "treating", "for treatment", and the like refer to methods of delaying, improving, reducing, or reversing a diagnosable condition suffered by a patient and the associated symptoms caused by the condition, and the prevention of the condition or any related symptoms.

The term "pharmaceutically acceptable" means that the substance or composition must be compatible with the other ingredients of its pharmacological formulation without exacerbating the symptoms of the patient.

The composition provided by the present invention can be prepared by using technologies well known to those having ordinary knowledge in the technical field to which the present invention belongs, and combining the active ingredient or composition provided by the present invention with at least one pharmaceutically acceptable vehicle for preparation of a dosage form suitable for the composition of the present invention. The dosage forms include, but are not limited to, solutions, emulsions, suspensions, powders, tablets, lozenges, oral dispersible film, chewing gum, capsules, and other similar or applicable dosage forms of the present invention.

The term "pharmaceutically acceptable carrier" includes one or more types of ingredients selected from the group consisting of solvents, emulsifiers, suspending agents, disintegrating agents, binders, excipients, stabilizers, chelating agents, diluents, gelling agents, preservatives, lubricants, surfactants, and other carriers similar or suitable for use in the present invention.

To the aforementioned composition, one or more of the above-mentioned dissolution aids, buffering agents, coloring agents, flavoring agents and the like, which are generally used in the field of preparations, may also be appropriately added as needed.

The term "pharmaceutically acceptable excipient" includes at least one of the following, but is not limited to, polymers, resins, plasticizers, fillers, lubricants, diluents, binders, disintegrants, solvents, co-solvents, surfactants, a preservative, a sweetener, a flavoring agent, a pharmaceutical-grade dye or pigment, and a viscosity agent.

The term "pharmaceutical composition" refers to a solid or liquid composition in a form, concentration, and degree of purity suitable for administration to a patient. After administration, it can induce desired physiological changes; the pharmaceutical composition is sterile and/or non-pyrogenic.

The term "effective amount" refers to the amount necessary to produce and cause an expected biological response, and is not a quantity required for therapeutic recovery. Those of ordinary skill in the art to which this invention belongs can understand that the effective amount of a pharmaceutical composition may vary depending on factors such as the desired biological endpoint, the bioactive agent to be delivered, the composition of the encapsulating matrix, and the target tissue, etc.

Unless otherwise specified, the materials used in the present invention are commercially available materials. The *Lactobacillus paracasei* used in the examples of the present invention is *Lactobacillus paracasei* GMNL-346 (hereinafter referred to as GMNL-346), which is deposited in Taiwan Food Industry Research and Development Institute and the deposition number is BCRC 910953 and China Center for Type Culture Collection (CCTCC) and the deposition number is CCTCC M 2019983.

The cell experiment in the embodiment of the present invention used human tongue squamous carcinoma cell line (SAS (RRID: CVCL_1675); hereinafter referred to as oral cancer cells) as the cell to verify the efficacy of *Lactobacillus paracasei* against oral cancer, and human normal oral cell lines (SG, Smulow-Glickman (SG) human gingival epithelial cell; hereinafter referred to as normal oral cells) were used as a control group, and these cell lines were all commercially available.

The animals indicated in the embodiment of the present invention are 8-12 week old male CAnN.Cg-Foxn1nu/CrlNarl immunodeficiency mice, which were purchased from the National Laboratory Animal Center, and the mice were kept in a room with a room temperature of 24±1° C. and relative humidity of 55±5% on a 12:12 day/night cycle with free access to food and water.

To fully understand the purpose, novel features and functions of present invention, following examples are provided with embodiments to explain the details of the present invention. However, it should be noted that the invention is not limited to the preferred embodiments shown.

Example 1 Inhibition of Oral Cancer Cell Growth by GMNL-346

GMNL-346 was cultured in a medium (DeMan-Rogosa-Sharpe, MRS) at 37° C. and 5% $CO_2$. After 48 hours, the culture medium was removed by centrifugation and the bacteria were resuspended in phosphate buffer saline (PBS) followed by heating at 121° C. for 15 minutes to obtain heat-killed GMNL-346 solution. After the heat-killed GMNL-346 solution was centrifuged at high speed, the supernatant was collected and filtered through a 0.22 μm filter membrane to obtain the supernatant of the heat-killed GMNL-346.

Oral cancer cells or normal oral cells were treated with two different batches of cultures (FIGS. 1A and B) of different concentrations of heat-killed GMNL-346 solution ($2.5\times10^1 \sim 2.5\times10^8$ cells/ml) for 72 hours. Then, the WST-1 assay was used to measure cell growth or the trypan blue exclusion assay was used to directly count the number of cells.

Figure 2:
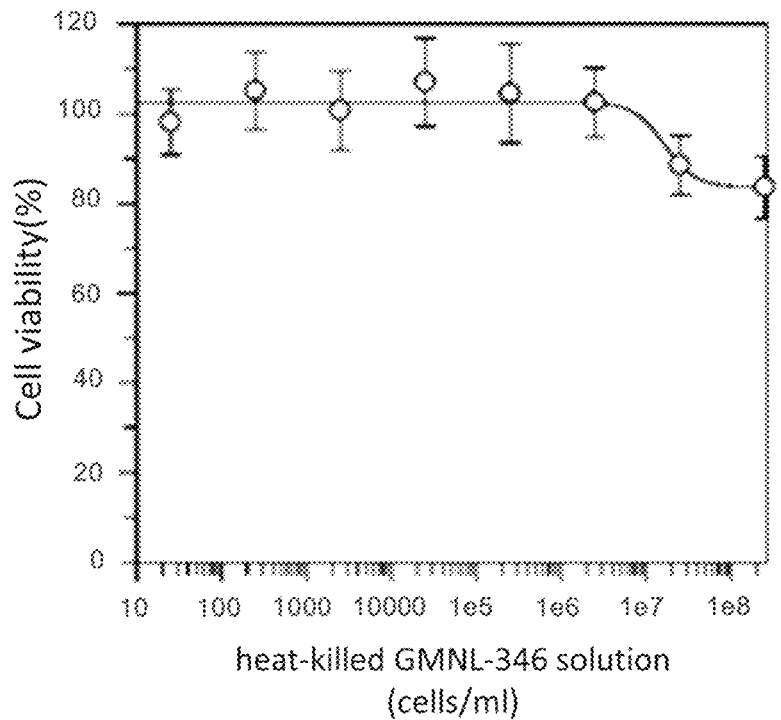
FIG. 2 is the effect of *Lactobacillus paracasei* GMNL-346 on normal oral cell growth.
Figure 3:
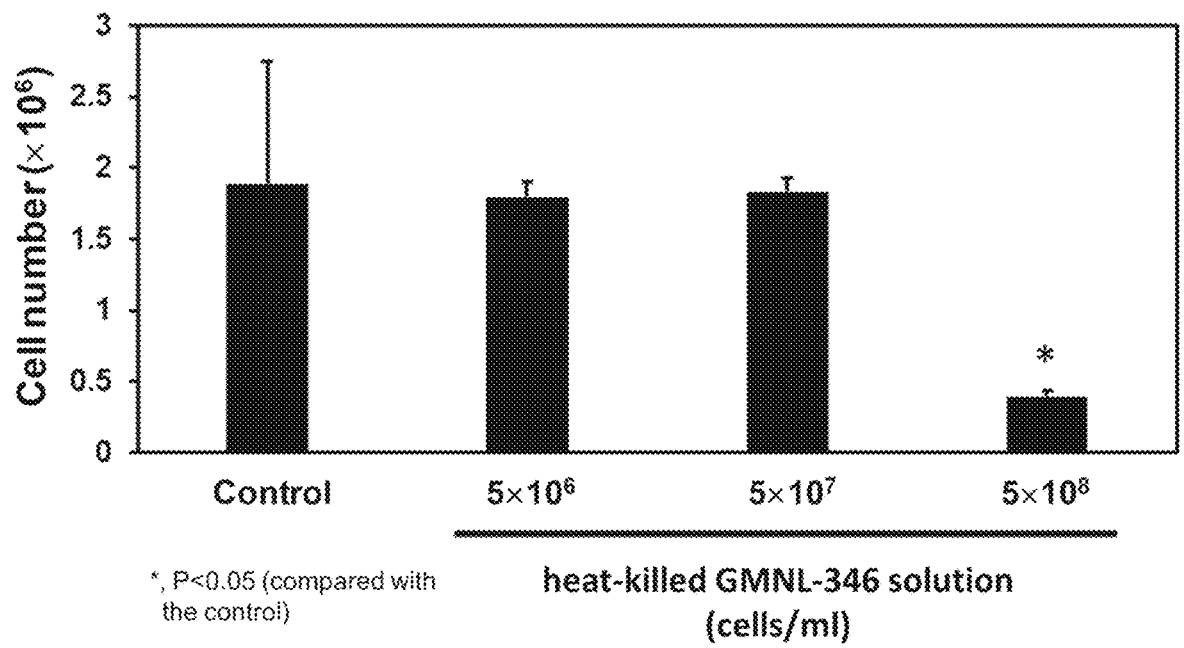
FIG. 3 is the effect of *Lactobacillus paracasei* GMNL-346 on oral cancer cell growth by using trypan blue exclusion assay.
Figure 4:
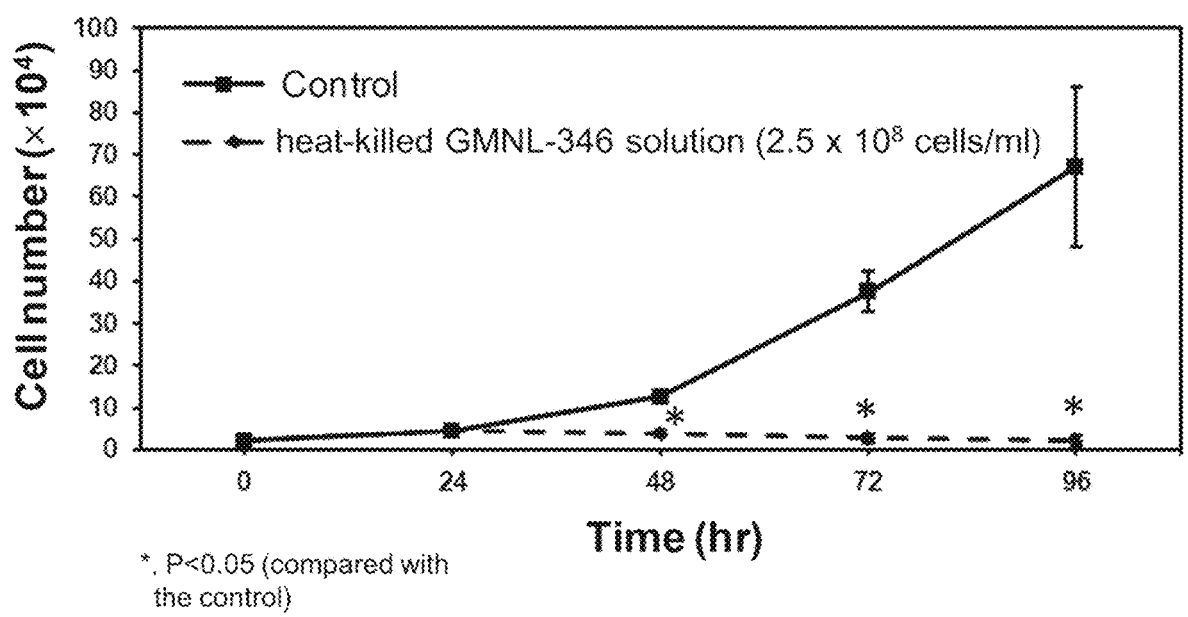
FIG. 4 is the effect of *Lactobacillus paracasei* GMNL-346 treatment on the growth curve of oral cancer cell.
Figure 5:
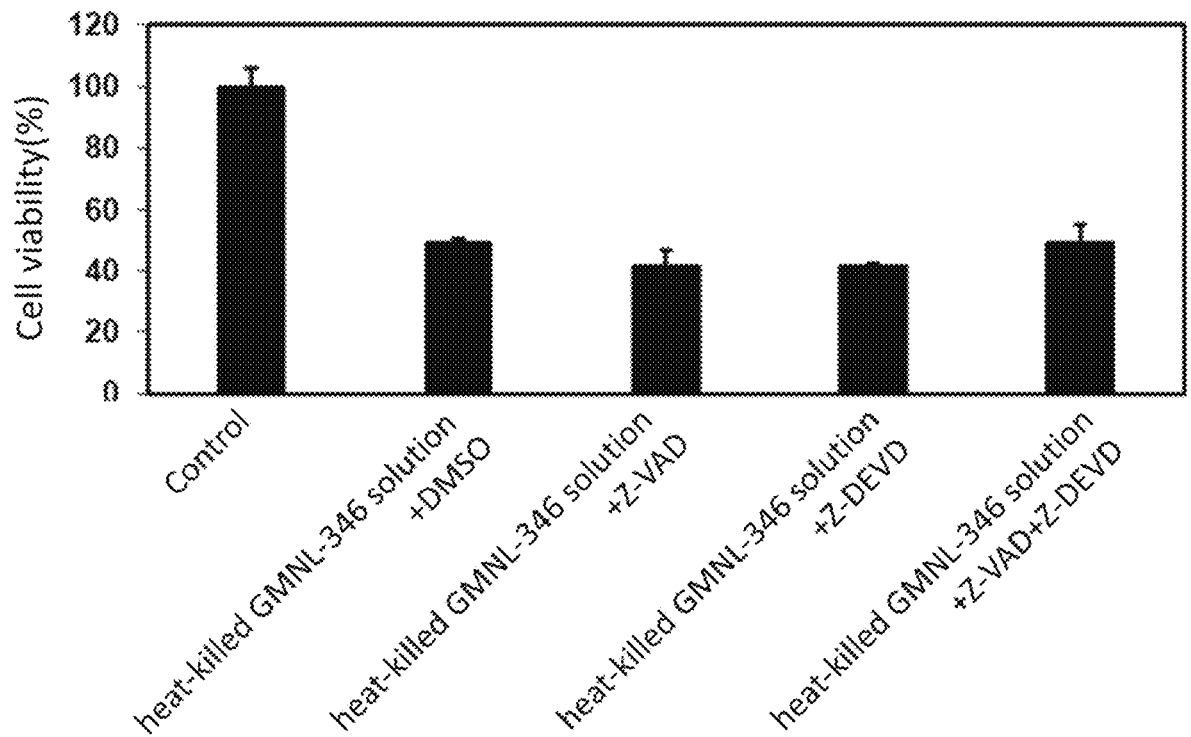
FIG. 5 is the result of the apoptosis assay on oral cancer cells treated with *Lactobacillus paracasei* GMNL-346.

As shown in FIGS. 1 to 4, GMNL-346 inhibits the growth of oral cancer cells (SAS), but does not cause toxicity to normal oral cells (SG). From FIG. 1, the effect of GMNL-346 on inhibiting the growth of oral cancer cells increases with the increasing concentrations of the treated GMNL-346 solution and among which, $2.5\times10^8$ cells/ml of GMNL-346 solution can inhibit the survival of oral cancer cells by 50%. FIG. 2 shows that GMNL-346 has no obvious toxicity to normal oral cells. After normal oral cells were treated with $2.5\times10^8$ cells/ml of GMNL-346 solution, the cell viability was still greater than 85%, suggesting that GMNL-346 can specifically inhibit the growth of oral cancer cells without affecting normal cells. Using GMNL-346 as an active ingredient for treating/anti-oral cancer has the advantage of reducing the side effects of cancer treatment. In addition, from the analysis of trypan blue exclusion assay in FIG. 3, it can also be found that GMNL-346 can effectively inhibit the growth of oral cancer cells; and the results in FIG. 4 show that the longer the treatment time of GMNL-346, the better the inhibition of the growth of oral cancer cells, and GMNL-346 can significantly inhibit the growth of oral cancer cells at 48 hours and the inhibitory effect can last up to 96 hours.

Example 2 the Mechanism of Inhibition of the Growth of Oral Cancer Cells by GMNL-346

Cell apoptosis assay and cell cycle analysis were used to verify which mechanism is used by GMNL-346 to inhibit the growth of oral cancer cells.

Cell Apoptosis Assay

Oral cancer cells (SAS) were pre-treated with apoptosis inhibitors, including z-VAD-FMK (broad spectrum caspase inhibitor) or z-DEVD-FMK (caspase-3 inhibitor), and the control (GMNL-346+DMSO) was treated with DMSO instead of apoptosis inhibitor. The pre-treated cells were followed by addition of the diluted heat-killed GMNL-346 solution and co-cultured for 72 hours before confirmation of cell growth.

Cell Cycle Analysis (1):

The BrdU flow kit (Cat. No. 559619, BD Biosciences, USA) was used to confirm the change in the cell cycle distribution. Specifically, the oral cancer cells were treated with the heat-killed GMNL-346 solution ($5\times10^8$ cells/ml). After 72 hours, the treated cells were fixed with 70% alcohol. The anti-BrdU antibody with FITC green fluorescence was then added to the fixed cells to label the cells at S phase, 7-aminoactinomycin D (7-AAD) DNA staining dye was used to label the cells at G1 and G2 phases, and fluorescence values were analyzed using flow cytometry.

Cell Cycle Analysis (2):

Regulation of the cell cycle is very complicated and many regulatory proteins are involved in this process, among which, (1) Cyclin-dependent kinases (CDKs) and cyclin proteins (Cyclins) are key proteins that determine when cells enter the next phase (cell cycle checkpoint).

(2) Retinoblastoma protein (pRb) is a protein that can bind to E2F transcription factor. pRb can prevent excessive cell growth by inhibiting cell cycle progression. When cells are ready to replicate and divide, before going from G1 to S, the Cyclin D-CDK4/6 complex will phosphorylate pRb to ppRb, the phosphorylated pRb (ppRb) will lose the activity of inhibition of cell cycle progression, and release the E2F transcription factor. The released E2F transcription factor will further activate other downstream cyclin proteins (such as cyclin E, cyclin A1, and cyclin B) and a series of genes related to DNA synthesis and replication to allow the cell cycle to proceed.

(3) Cell cycle inhibitory protein (CKI) is a protein that can regulate the progress of the cell cycle by inhibiting the activity of CDK or CDK-cyclin complex; p16-INK4a is the cell cycle inhibitory protein at the G1 phase and can bind to CDK 4/6 and inhibit the activity of CDK 4/6.

The cell cycle analysis (2) was performed by analyzing the expression level of cell cycle-related proteins with western blot. Specifically, the oral cancer cells were treated with the heat-killed GMNL-346 solution ($5\times10^8$ cells/ml) or the 20-fold diluted supernatant of the heat-killed GMNL-346. The treated cells were collected at different time points for protein extraction. Primary antibodies against phosphorylate-pRb (ppRb), retinoblastoma protein (pRb), p16-

INK4a, cyclin-dependent kinase 4 (CDK4) or cyclin-dependent kinase 6 (CDK6) were used to confirm the expression level of the corresponding proteins, and the protein expression level of housekeeping genes (β-actin or GAPDH) were used as an internal control, and the oral cancer cells without treatment were used as a control. Apoptosis assay and cell cycle analysis results:

The results are shown in FIGS. 5-8. From the results of the apoptosis assay in FIG. 5, GMNL-346 can inhibit the proliferation of oral cancer cells even in the presence of apoptosis inhibitors. This result indicates that GMNL-346 does not inhibit the growth of oral cancer cells through inducing apoptosis.

Figure 6:
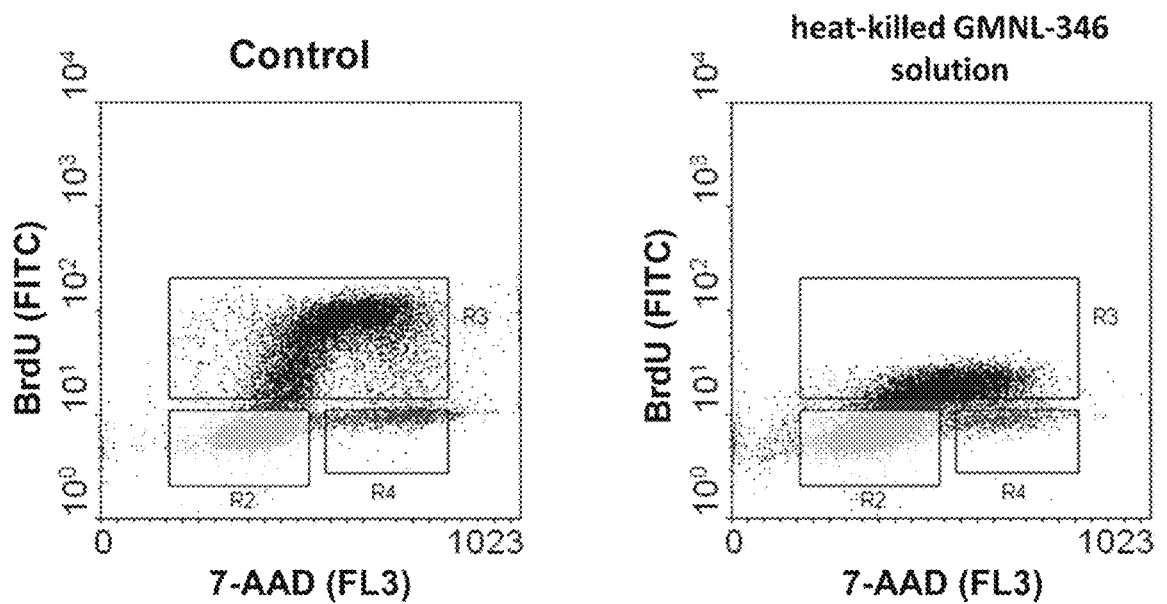
FIG. 6 is the result of the cell cycle analysis on oral cancer cells treated with *Lactobacillus paracasei* GMNL-346.

In the cell cycle analysis results in FIG. 6 and Table 1, it is found that the oral cell cancer treated with GMNL-346 has a significant change in the cell cycle distribution. The ratio of G0/G1 phase cells is obviously increased, and the ratio of cells within DNA replication phase (S phase) is decreased obviously. The results demonstrate that GMNL-346 can arrest the cell cycle of oral cancer cells at G0/G1 phase and make cells stop dividing which causes the inhibition of oral cancer cell growth.

TABLE 1

| | Cell cycle distribution of oral cancer cells | |
|---|---|---|
| | Control | GMNL-346 |
| R2(G0/G1 phase) | 35.37% | 46.14% |
| R3(S phase) | 51.81% | 35.3% |
| R4(G2/M phase) | 6.02% | 4.8% |

Figure 7:
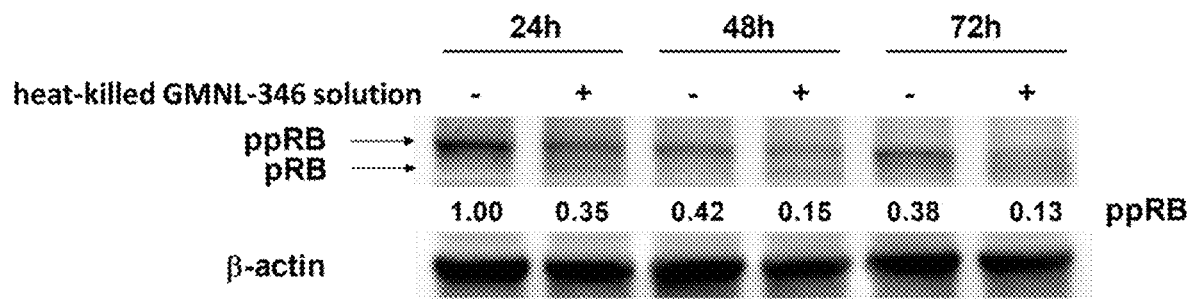
FIG. 7 shows the effect of *Lactobacillus paracasei* GMNL-346 on the expression level of the cell cycle protein in oral cancer cells (1).

According to the results of Western blot in FIG. 7, the treatment of GMNL-346 can significantly reduce the expression level of ppRb (phosphorylated-pRb) in oral cancer cells, and the longer the treatment time, the more significant in the decrease of the ppRb expression. This result indicates that GMNL-346 arrests the cell cycle of oral cancer cells at the G0/G1 phase through inhibition of the phosphorylation of pRb and causes the inhibition of oral cancer cell growth.

Figure 8:
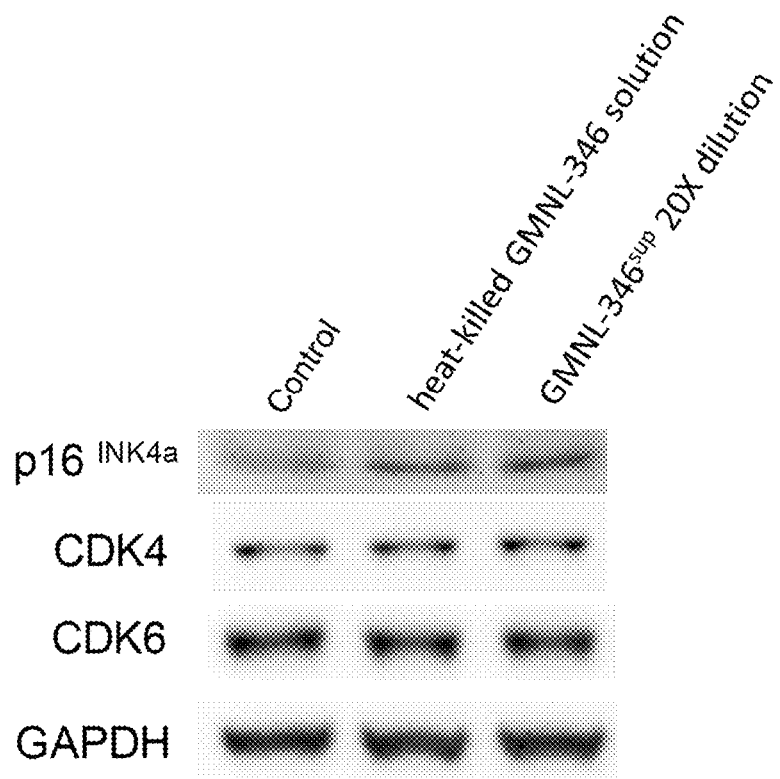
FIG. 8 shows the effect of *Lactobacillus paracasei* GMNL-346 on the expression level of the cell cycle protein in oral cancer cells (2).

In addition, the Western blot results in FIG. 8 show that both the heat-killed GMNL-346 solution and the 20-fold diluted supernatant of the heat-killed GMNL-346 (GMNL-346suP 20× dilution) significantly increase the expression level of p16-INK4a. This result indicates that GMNL-346 increases the expression level of p16-INK4a. It causes pRb to fail to be phosphorylated through the CDK 4/6 inhibitory activity of p16-INK4a, and thus the cell cycle of oral cancer cells is suppressed (G1 arrest).

Figure 9:
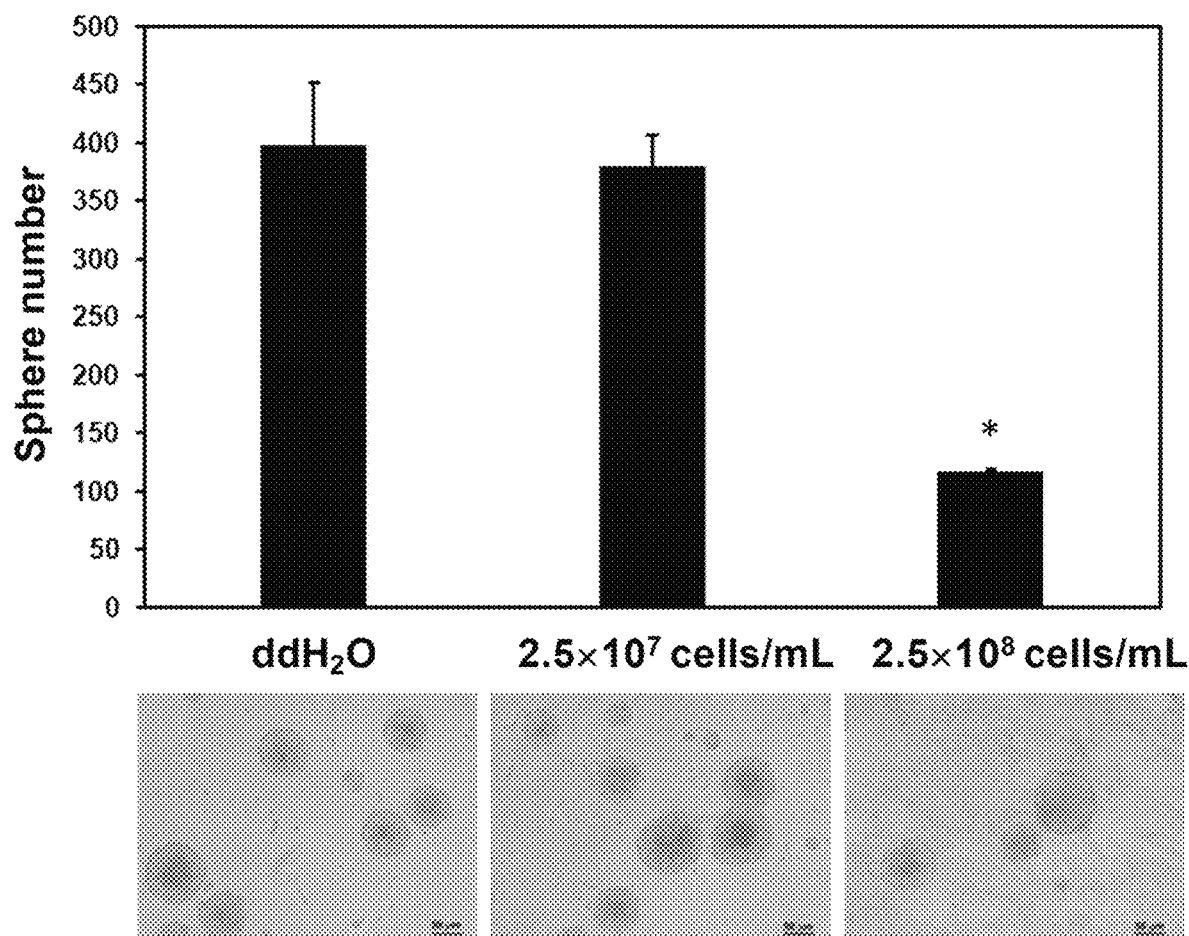
FIG. 9 shows the effect of *Lactobacillus paracasei* GMNL-346 on the self-renewal ability of the oral cancer stem cells.

Example 3 the Effect of GMNL-346 on the Self-Renewal Ability of Oral Cancer Cells Cancer stem cells or more malignant cancer cells have better self-renewal ability, can proliferate and divide to form spheroids with a small number, and have a high potential to form tumors and develop into cancer. To understand the effect of GMNL-346 on the self-renewal ability of oral cancer cells, cancer spheroid culture was used to analyze the activity of cancer stem cells in oral cancer cells. Specifically, the cancer spheroid culture was performed by culturing the oral cancer cells in the ultra-low attachment cell culture plates with fetal bovine serum-free DMEM/F12 medium (containing 20 ng/ml of epidermal growth factor (EGF), 20 ng/ml of basic fibroblast growth factor (bFGF), 1×B27 supplement, 1 µM of hydrocortisone, 5 µg/ml of insulin, 4 µg/ml of heparin) and the heat-killed GMNL-346 solution ($5 \times 10^7$ or $5 \times 10^8$ cells/ml). After 7 days post culture, the number of oral cancer spheres was observed and counted with an inverted microscope. The results are shown in FIG. 9. GMNL-346 treatment causes a reduction of the number of oral cancer spheres. Particularly, a more significant reduction occurs when treated with $5 \times 10^8$ cells/ml of GMNL-346, suggesting that GMNL-346 can inhibit the self-renewal ability of the cancer stem cells in oral cancer cells and reduce the possibility of tumor formation.

Example 4 the Treatment Effect of GMNL-346 on the Mice with Oral Cancer

Tumor Growth Experiment:

Experiment in oral cancer animal model was performed as shown in FIG. 10A. Mice were orally given the heat-killed GMNL-346 solution ($1 \times 10^9$ cells) for two consecutive days before oral cancer cells were implanted. Then oral cancer cells were implanted subcutaneously on the backs of mice, and tumors were formed after 30 days. The mice were given the heat-killed GMNL-346 solution ($1 \times 10^9$ cells) by oral gavage 5 days per week, starting when tumors were formed. After 4 weeks, the mice were sacrificed and their tumors were excised and weighed.

Survival Rate Analysis:

The procedure of the survival rate analysis is the same as the aforementioned tumor growth experiment. The day that the oral cancer cells are implanted on the back of the mouse is defined as day 0 of the experiment. When the tumor grows to about 50 mm³ in size on day 30, the mice were given the heat-killed GMNL-346 solution ($1 \times 10^9$ cells) once a day (five days per week) for 4 consecutive weeks via oral gavage and the survival of the mice was recorded for 59 days.

Immunohistochemical Staining:

The excised tumors were fixed with formalin solution, embedded in paraffin and sectioned. The immunohistochemical staining was used to analyze the expression level of proteins such as tumor cell proliferation marker Ki-67, Cyclin A2, and retinoblastoma protein (pRb) in tumors.

Results

Figure 10:
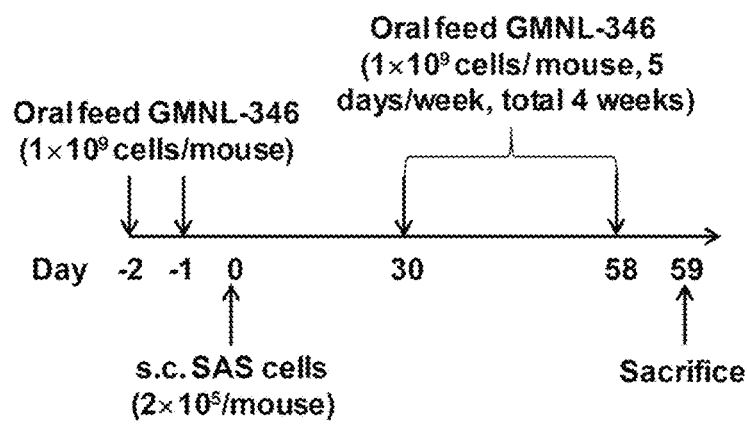
FIG. 10 shows the treatment effect of *Lactobacillus paracasei* GMNL-346 on mouse models of oral cancer. (A) shows the scheme of experimental design, (B) shows the result of tumor growth, and (C) shows the result of survival rate analysis.
Figure 10:
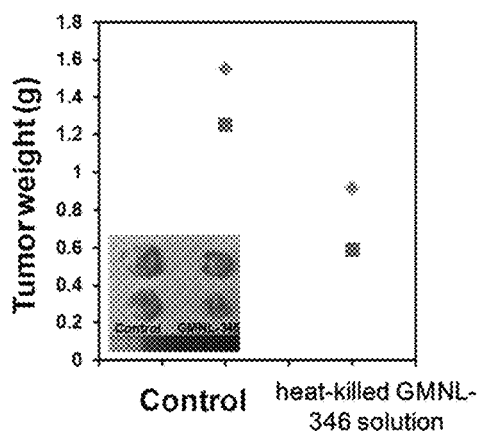
Figure 10:
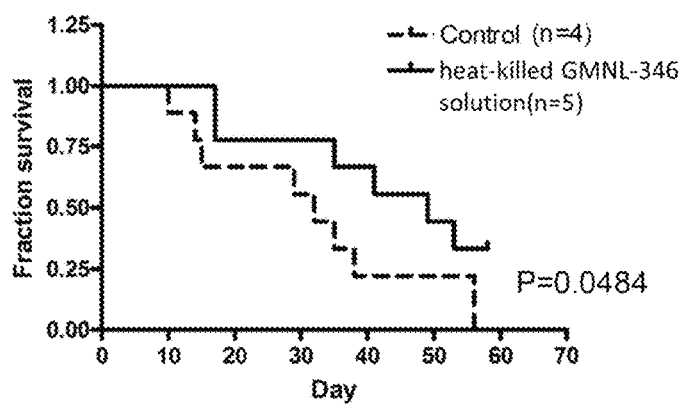
Figure 11:
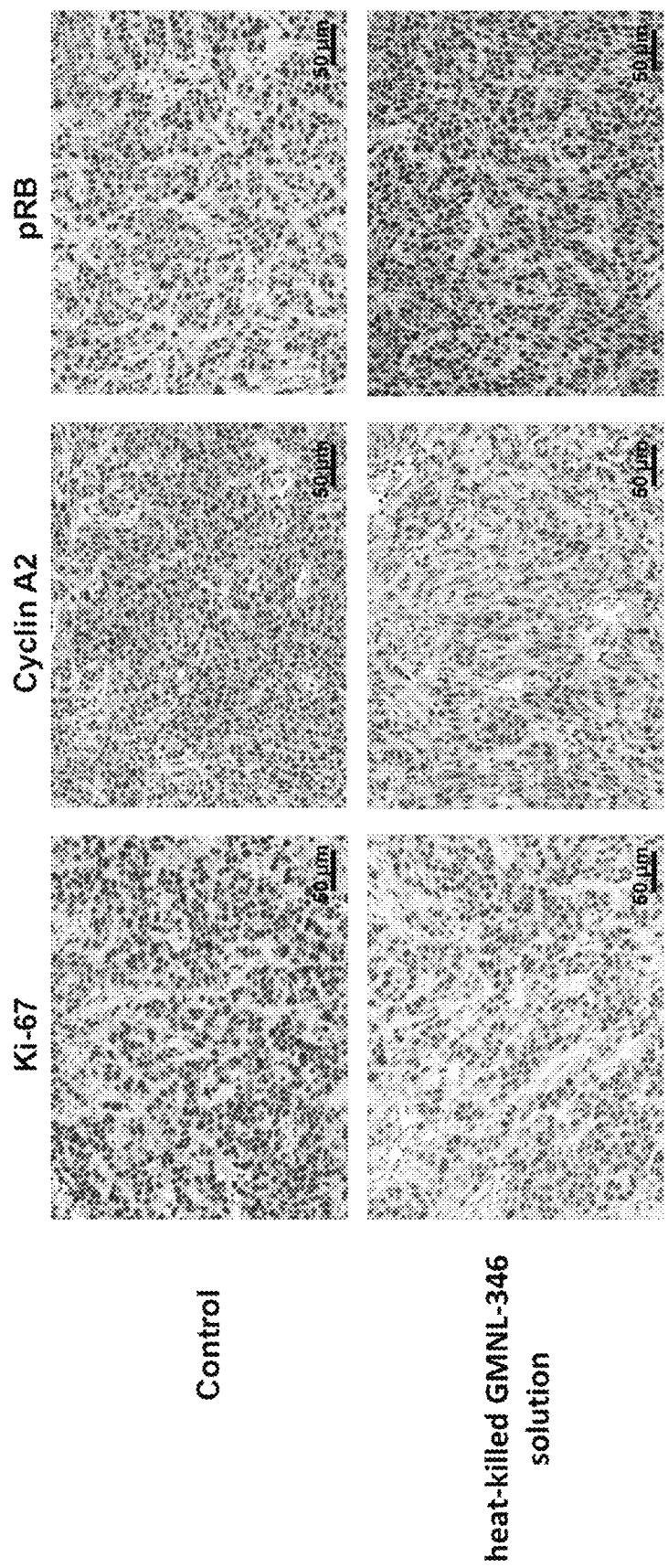
FIG. 11 is the immunohistochemistry result of the mice with oral cancer treated with GMNL-346.

The results are shown in FIGS. 10-11. From the results of the tumor growth experiment in FIG. 10B, oral administration of GMNL-346 effectively slowed down the tumor growth rate in mice and made the tumors obviously smaller. The results of the mouse survival analysis in FIG. 10C indicate that oral administration of GMNL-346 can effectively prolong the survival time of tumor-bearing mice. According to the results of these experiments, GMNL-346 does have antitumor activity against oral cancer. In addition, it can be seen from the results of the immunohistochemical staining in FIG. 11 that the expression levels of tumor cell proliferation marker Ki-67 and cyclin A2, which assist cell division, were decreased, and the expression level of the retinoblastoma protein (pRb) was increased in GMNL-346 treated mice which indicates that oral administration of GMNL-346 can inhibit tumor growth in mice. The staining results are also consistent with the results of previous oral cancer cell model experiments.

Experiment 5 Analysis of the Anti-Oral Cancer Substance of GMNL-346

In order to find out the active substance of GMNL-346 responsible for the oral cancer cell growth inhibition, the heat-killed GMNL-346 solution ($1 \times 10^{10}$ cells/ml) as recited in Experiment 1 was subjected to high-speed centrifugation to separate the supernatant from the bacterial cell bodies or debris followed by filtering through a 0.22 µm membrane filter to completely remove the bacterial cell bodies/debris and give a supernatant of the heat-killed GMNL-346. The supernatant was used for further analysis of the inhibition effect on oral cancer cells.

Figure 12:
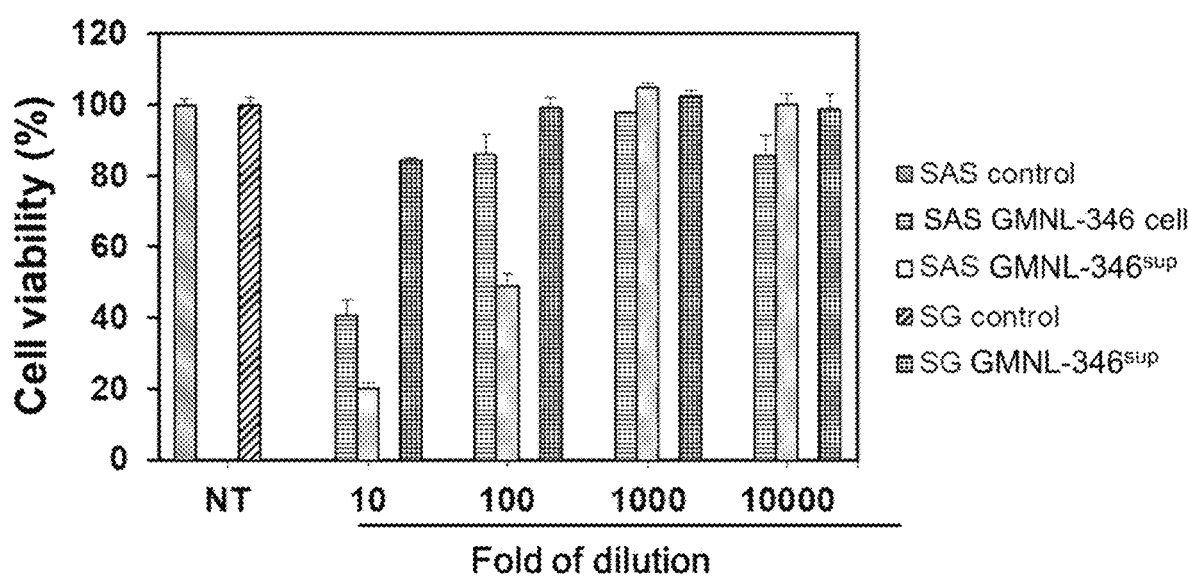
FIG. 12 shows the inhibition effect of the supernatant of the heat-killed GMNL-346 or GMNL-346 bacteria on oral cancer cells.

The results are shown in FIG. 12. The supernatant of the heat-killed GMNL-346 does not affect the growth of normal oral cells (SG), and both the 10-fold diluted supernatant and GMNL-346 cells can kill oral cancer cells (SAS). In addition, the supernatant of the heat-killed GMNL-346 can kill up to 80% of oral cancer cells, which is twice as much as GMNL-346 cells Similar results were also found in the 100-fold diluted supernatant group. The results suggest that the main active substance of GMNL-346 for inhibiting oral cancer cell growth is in the supernatant of the heat-killed GMNL-346.

Figure 13:
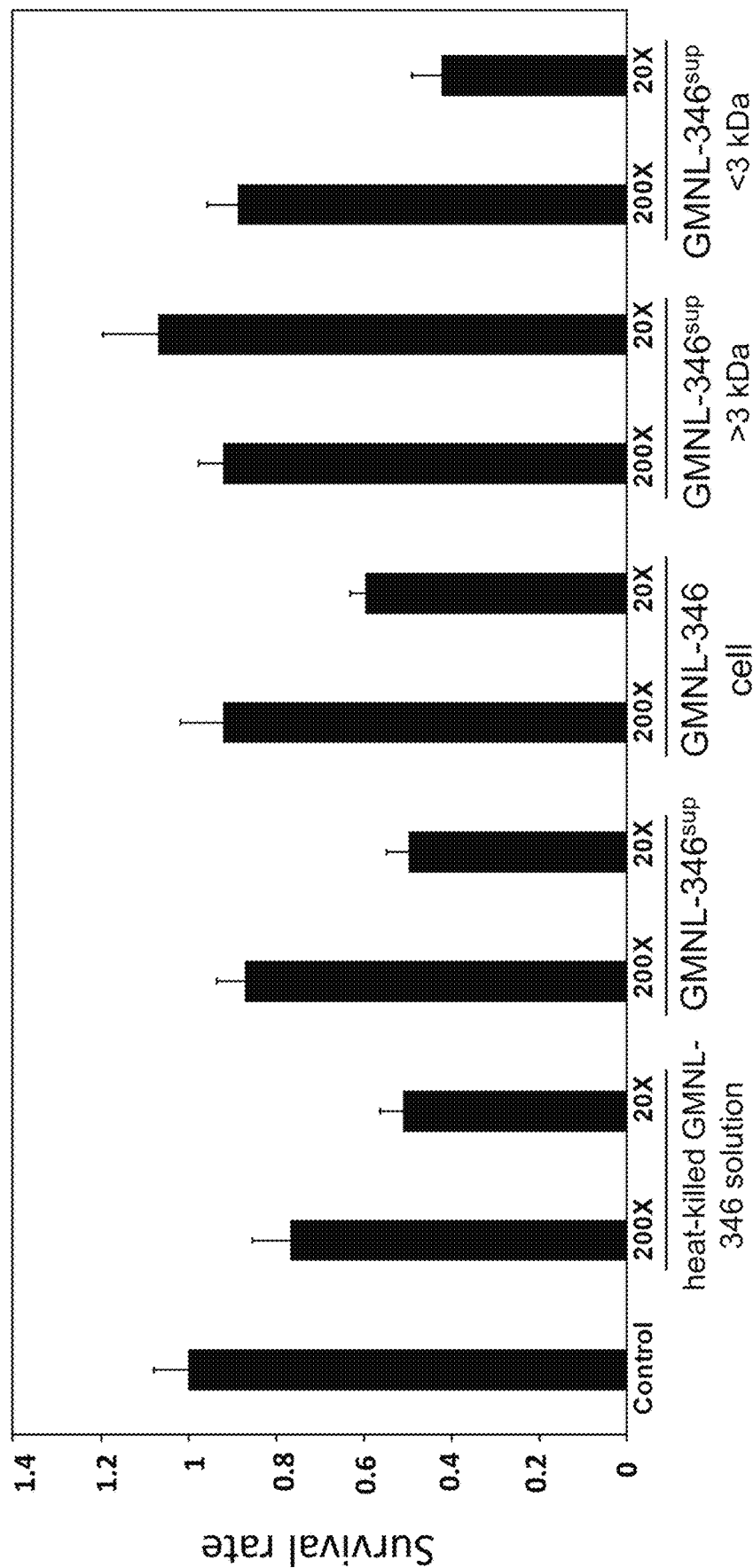
FIG. 13 shows the inhibition effect of different portion of the supernatant of the heat-killed GMNL-346 on oral cancer cells.

Accordingly, the above-mentioned supernatant was further filtered through a 3 kDa Amicon filter membrane, and separated into two parts according to the molecular weight. The inhibitory effect of the two parts of supernatant on the growth of oral cancer cells was examined. The results are shown in FIG. 13 and only the part of supernatant that contains proteins with a molecular weight less than 3 kDa has the ability to inhibit the growth of oral cancer cells and the part of supernatant containing proteins with a large molecular weight does not affect the growth of oral cancer cells.

Experiment 6 Analysis of the Protein Concentration of the Supernatant of Heat-Killed GMNL-346

After culturing GMNL-346 in a bioreactor, the solution was centrifuged at 4000 rpm for 15 minutes and the supernatant was removed. The bacterial cells were washed twice with sterile MQ water and the bacterial concentration was adjusted to $1 \times 10^{10}$ cfu/ml.

A. The supernatant was collected after centrifugation at 4000 rpm for 15 minutes, and the bacterial cells were removed. This supernatant is referred to as Live 346 sup.

B. The supernatant was collected after centrifugation at 4000 rpm for 15 minutes, following sterilization at 121° C. for 15 minutes, and the bacterial cells were removed. This supernatant is referred to as HK 346 sup.

The protein concentration of both supernatants was measured using the BCA assay and the absorbance at 562 nm (OD562) was measured using the ELISA reader to calculate the protein concentration, and the result are presented in Table 2.

TABLE 2

| supernatant | ug/ml |
|---|---|
| Live 346 | 21.57 |
| HK 346 | 403 |

From Table 2, it can be observed that the protein concentration in the supernatant of heat-killed GMNL-346 is approximately 20 times higher than that without heat-killing treatment. In other words, the heat-killing step of *Lactobacillus paracasei* GMNL-346 can further enhance the protein concentration.

Experiment 7 Heat-Killed GMNL-346 can Further Inhibit the Survival of Oral Cancer Oral cancer cells (SAS) were seeded at a density of $4 \times 10^3$ cells/well in a 96-well plate. After overnight incubation, 20 µl of either non-heat-killed GMNL-346 supernatant (Live 346 sup) or heat-killed GMNL-346 supernatant (HK 346 sup) was added to each well, and the cells were co-cultured for 72 hours. The cell proliferation was measured using the MTT assay.

Figure 14:
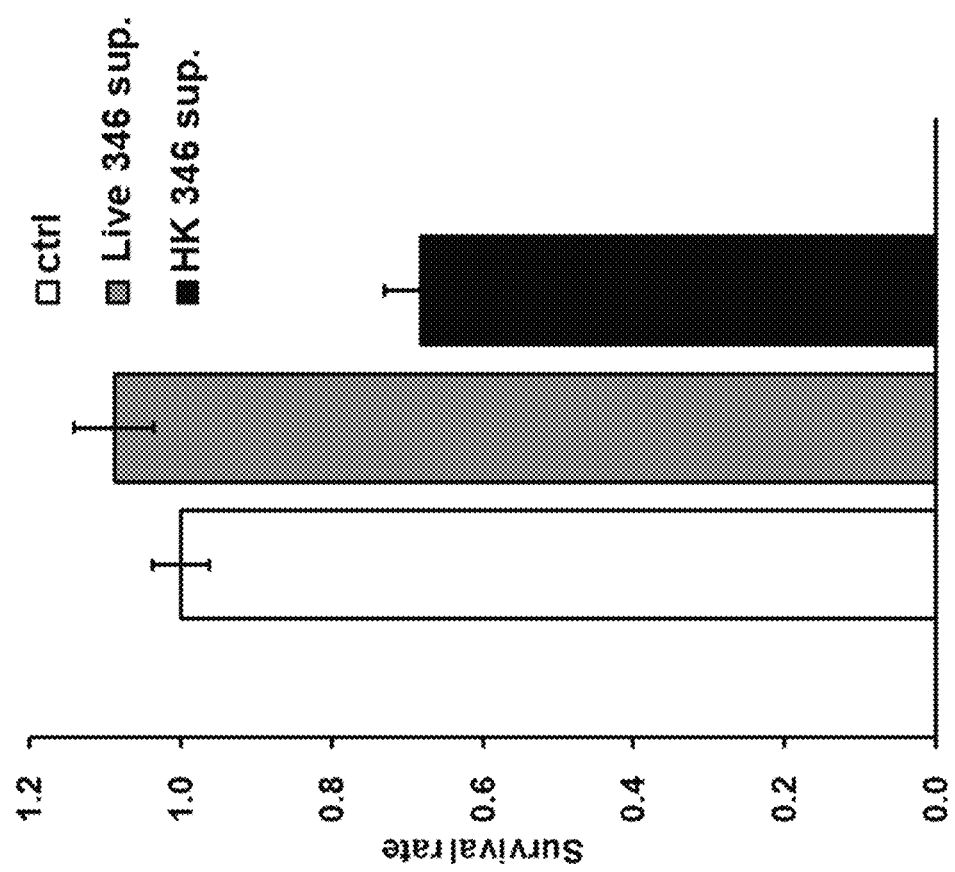
FIG. 14 shows the inhibition effect of heat-killed GMNL-346 supernatant on oral cancer cells growth.

The results are shown in FIG. 14. Heat-killed GMNL-346 significantly further reduces the growth rate of SAS cells. The cell survival analysis in FIG. 14 indicates that heating *Lactobacillus paracasei* GMNL-346 causes the release of substances from within or on the surface of bacterial cells into the supernatant that effectively inhibit cancer cell growth. Without heating, these substances are present in the supernatant at low concentrations.

After years of research, the inventor of the present invention successfully isolated *Lactobacillus paracasei* GMNL-346. This GMNL-346 strain can not only inhibit the growth of oral cancer cells by inhibiting cell cycle progression or inhibiting cancer stem cells from self-renewal, but is not toxic to normal oral cells and therefore it is very suitable for use as an active ingredient for preventing or treating oral cancer. The inventors of the present invention also confirms that in addition to the bacterial cell of *Lactobacillus paracasei* GMNL-346, the supernatant of the heat-killed GMNL-346 also has the effect on growth inhibition of oral cancer cells and the better anti-oral cancer effect is found in the part of the supernatant containing molecules with a molecular weight less than 3 kDa.

Those with ordinary knowledge in the field to which the present invention belongs may clearly know that the information disclosed in the preferred embodiments of the present specification are merely examples, and those with ordinary knowledge in the technical field to which the present invention pertains may implement the examples with changes and modifications without differing from the technical features of the present invention. The claims provided in this specification define the scope of the present invention, and the scope covers the aforementioned methods and structures and equivalent inventions.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A method for treating human tongue squamous carcinoma cells (SAS, RRID: CVCL_1675), comprising administering a composition comprising a supernatant of heat-killed *Lactobacillus paracasei* GMNL-346, wherein the supernatant of heat-killed GMNL-346 derived from *Lactobacillus paracasei* GMNL-346 bacterial cultures are cultured for 48 hours and heat killed at 121° C. for 15 minutes and filtered through a 0.22 µm filter membrane and further filtered through a 3 KDa filter membrane; wherein the supernatant of heat-killed GMNL-346 contains molecular with a molecular weight less than 3 kDa; wherein a deposition number of the *Lactobacillus paracasei* GMNL-346 is CCTCC M 2019983.

2. The method as recited in claim 1, wherein the treating human tongue squamous carcinoma cells (SAS, RRID: CVCL_1675) refers to inhibition of cell cycle progression of human tongue squamous carcinoma cells (SAS, RRID: CVCL_1675).

3. The method as recited in claim 2, wherein the inhibition of cell cycle progression of human tongue squamous carcinoma cells (SAS, RRID: CVCL_1675) refers to inducing G0/G1 cell cycle arrest of human tongue squamous carcinoma cells (SAS, RRID: CVCL_1675).

4. The method as recited in claim 1, wherein the treating human tongue squamous carcinoma cells (SAS, RRID: CVCL_1675) refers to inhibition of self-renewal ability of human tongue squamous carcinoma stem cells (SAS, RRID: CVCL_1675).

* * * * *